(12) United States Patent
Hsu (10) Patent No.: US 7,938,560 B2
(45) Date of Patent: May 10, 2011

(54) MULTIFUNCTION LAMP (76) Inventor: Chia-Yi Hsu, Taipei (TW)

( * ) Notice: Subject to any disclaimer, the term of this patent is extended or adjusted under 35 U.S.C. 154(b) by 329 days.

(21) Appl. No.: 11/887,251

(22) PCT Filed: Mar. 22, 2006

(86) PCT No.: PCT/CN2006/000464
§ 371 (c)(1),
(2), (4) Date: Sep. 27, 2007

(87) PCT Pub. No.: WO2006/102827
PCT Pub. Date: Oct. 5, 2006

(65) Prior Publication Data
US 2008/0232107 A1    Sep. 25, 2008

(30) Foreign Application Priority Data

Mar. 30, 2005  (CN) .......................... 2005 1 0062932

(51) Int. Cl.
*F21V 7/00* (2006.01)
(52) U.S. Cl. ......... 362/243; 362/600; 362/277; 362/297
(58) Field of Classification Search ........... 362/600–630
See application file for complete search history.

(56) References Cited

U.S. PATENT DOCUMENTS

2006/0274549 A1 * 12/2006 Fukuyoshi .................... 362/602
2008/0232107 A1 *  9/2008 Hsu .............................. 362/277

* cited by examiner

*Primary Examiner* — Anabel M Ton (57) ABSTRACT

A multifunction lamp comprises: a light source; a first reflector receiving and reflecting the projected light from the light source; a second reflector receiving and reflecting the reflected light from the first reflector; a first light-guide member which is provided between the light source and the first reflector or and the end of the first reflector away form the light source; and a second light-guide member guiding the light reflected by the second reflector out of the lamp.

15 Claims, 7 Drawing Sheets

MULTIFUNCTION LAMP

BACKGROUND OF THE INVENTION

1. Field of the Invention

The present invention relates to a lamp and more particularly, to a multifunction lamp, which uses an adjustable optical reflecting system to selectively change the optical path, providing different illumination functions.

2. Description of the Related Art

Many different types of lamps and lighting fixtures are seen in our surrounding. Since the invention of lamp, the living manner of "work as sun rises, rest as sun sets" is completely changed. Illumination brings convenience to people. By means of illumination, we get more time and places for activity. Therefore, illumination greatly changes our living style. Conventional lighting fixtures, such as floor lamps, torch lamps, desk lamps, wall lamps, bed-top reading lamps, and etc. are commonly composed of light source, lampshade, electric wires, switch, transformer, and/or electronic controller. These conventional lighting fixtures may provide different shape designs, however their basic architecture and function are same.

Following progress of civilization, lighting fixture in our life is not simply to satisfy illumination for working. It is also used as decorative means to provide a decorative atmosphere. To satisfy different demands, different types and modes of lighting fixtures are developed.

SUMMARY OF THE INVENTION

The present invention has been accomplished under the circumstances in view. It is the main object of the present invention to provide a cost-effective lighting fixture, which provides multiple illumination functions to satisfy different illumination requirements so as to improve illumination quality grade in our life and saving much installation cost and space.

According to one embodiment of the present invention, the multifunction lamp comprises a light source; a first reflector for receiving light from the light source and reflecting received light; a second reflector for receiving light from the first reflector and reflecting received light; a first light-guide member selectively settable in a first position between the light source and the first reflector and a second position at one end of the first reflector opposite to the light source; and a second light-guide member for guiding out light from the second reflector.

Further, the first reflector can be adjusted to let light pass or to mask light.

Further, the first reflector and the light source are fixedly connected together.

Further, the first light-guide member can be a cavity tube.

Further, the first light-guide member can be a transparent solid material.

Further, the first light-guide member and the second light-guide member are respectively disposed in two separated spaces.

Further, the second light-guide member can be comprised of two light-guide members symmetrically disposed at two sides relative to said first light-guide member.

According to an alternate form of the present invention, the multifunction lamp comprises a light source; light reflector means settable between a first position to let light pass and a second position to reflects light in the reversed direction; and an asymmetric light-guide column, the asymmetric light-guide column comprising a first light-guide zone and a second light-guide zone; wherein light from the light sources goes through the first light-guide zone of the asymmetric light-guide columns toward the light reflector means, and the light reflector means reflects light passing out of the first light-guide zone in the reversed direction toward the second light-guide zone when the light reflector means is set in the second position.

Further, the asymmetric light-guide column comprises an air cavity forming the first light-guide zone, and an optically denser wedge-like member forming the second light-guide zone, the optically denser wedge-like member having the shape of a triangle prism.

The lamp further comprises an optical fiber bundle fixedly mounted on a top side thereof for guiding light.

The lamp further comprises a light permeable ornament mounted on a top side thereof.

Further, the second light-guide zone is formed of polymethylmethacrylate, having an air interface slope abutted against the first light-guide zone for causing total internal reflection, and a pivoted photomask is provided and adapted to reflect light from the second light-guide zone downwards to an external work surface.

According to another alternate form of the present invention, the lamp comprises a light source; a first light-guide fixedly connected to the light source; a lighting fixture main body; a coupling means coupling the light source and the first light-guide to the lighting fixture main body and operable to move the light source and the first light-guide in and out of the lighting fixture main body between a received position inside the lighting fixture main body and an extended position outside the lighting fixture main body; the lighting fixture main body comprising fixed reflector unit formed of a first reflector and a second reflector, the first reflector being adapted to reflect light toward the second reflector, and a second light-guide adapted to guide reflected light from the second reflector toward a predetermined direction.

Further, the first light-guide member and the second light-guide member are disposed side to side in different spaces.

Further, the second light-guide member is comprised of two light-guide members arranged at two sides of the first light-guide.

Further, the first light-guide member and the second light-guide member are disposed in two separated spaces one behind the other; the first light-guide member is a transparent light-guide member disposed in a front space the second light-guide member is disposed in a rear space behind the front space; a reflection refraction mechanism is provided to project light entering the second light-guide member toward a front side for diffusion through first light-guide member.

BRIEF DESCRIPTION OF THE DRAWINGS

FIG. 3-1 is an enlarged view of a part of FIG. 3.

FIG. 6-1~6-4 are schematic drawings of a multifunction lamp in accordance with a sixth embodiment of the present invention.

FIG. 7-1~7-4 are schematic drawings of different forms of closable reflector in accordance with a second embodiment of the present invention.

DETAILED DESCRIPTION OF THE PREFERRED EMBODIMENT

Figure 1:
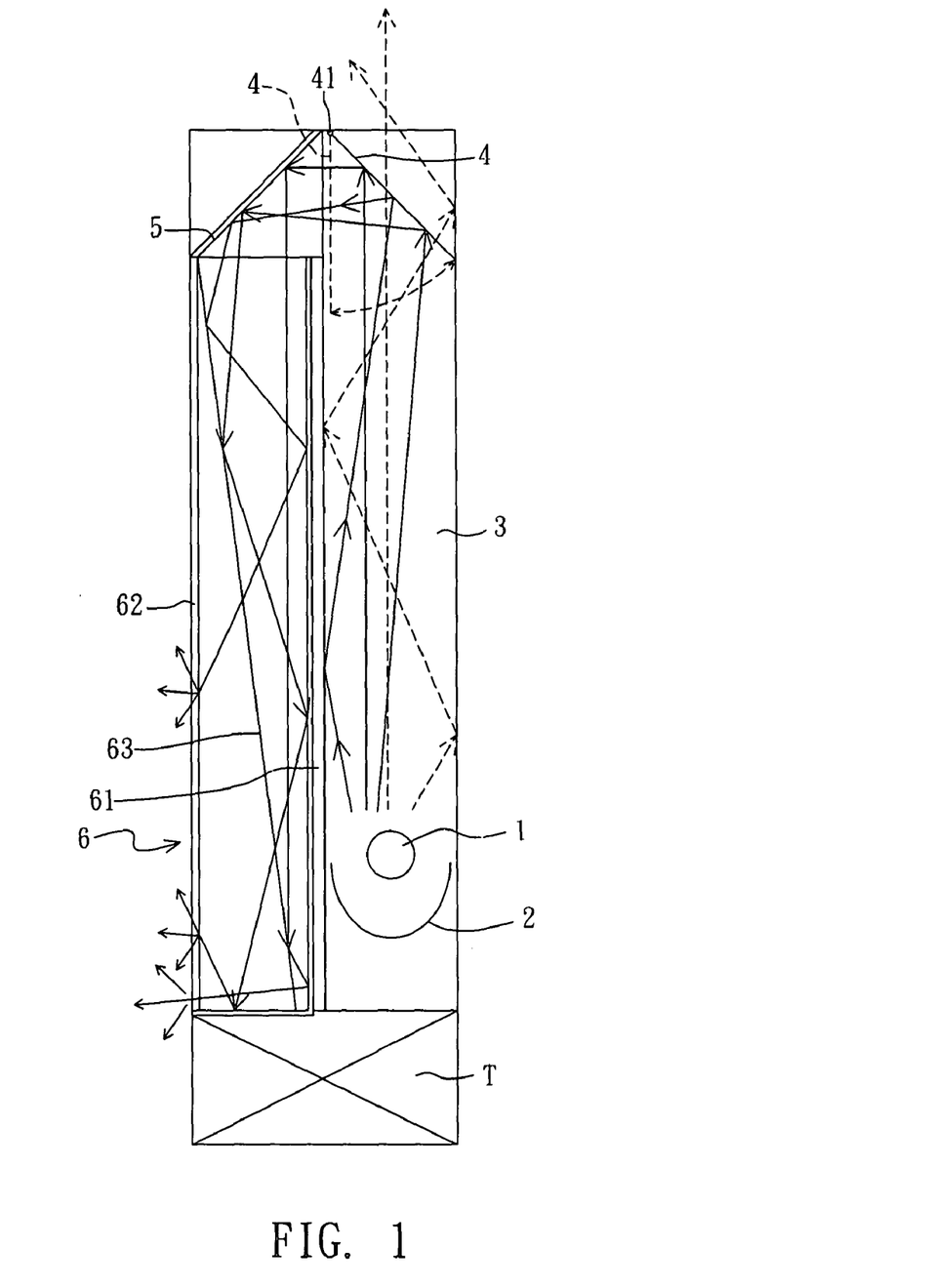
FIG. 1 is a schematic drawing of a multifunction lamp in accordance with a first embodiment of the present invention.

Referring to FIG. 1, a lamp in accordance with the present invention is essentially comprised of a light source 1, a light-gathering device 2, a first light-guide member 3, a first reflector 4, a second reflector 5, a second light-guide member 6, and a transformer or controller T.

The light source 1 can be comprised of a plurality of lamp bulbs, lamp tubes, LEDs (light emitting diodes) arranged in an array.

The light-gathering device 2 is provided at the rear side of the emitting direction of the light source 1 to gather backward light from the light source 1 and to project gathered light forwards.

The first light-guide member 3 can be a hollow or solid member adapted to define light rays emitted from the aforesaid light source 1 toward a specific direction.

The first reflector 4 is a position-adjustable mirror face. The formation of the mirror face can be achieved by means of film coating technique or any of a variety of other suitable measures. To provide the desired position adjustment function, the first reflector 4 is provided with a pivot 41. By means of the pivot 41, the first reflector 4 is selectively adjustable between two stable state static positions, i.e., the first reflector 4 can be held in an extended where the first reflector 4 tilted at an angle of 45 degrees, or a received position where the first reflector 4 is held in vertical (see the imaginary line). When the first reflector 4 is held tilted at an angle of 45 degrees, it reflects light to the second reflector 5.

The second reflector 5 is for secondary reflection. Basically, the second reflector 5 is held tilted opposite to the first reflector 4, and adapted to reflect reflected light from the first reflector 4 toward a specific direction. The second reflector 5 can be fixedly positioned at a predetermined angle. It can be a planar reflector, or a right angle prism for reflecting light based on total internal reflection.

The second light-guide member 6 is disposed at one side relative to the first light-guide member 3 in the reflecting direction of the second reflector 5, comprising a light reflecting element 61 at the inner side, a light scattering element 62 at the outer side, and a wedge-shaped light guiding element 63 sandwiched between the light reflecting element 61 and the light scattering element 62. The light reflecting element 61 and the light scattering element 62 are known devices intensively used in LCD TVs and LCD monitors. The first light-guide member 3 and the second light-guide member 6 are integrated, showing the whole appearance of the lamp.

Referring to FIG. 1 again, when the light source 1 is started, light rays go upwards and guided forwards by the first light-guide member 3, providing a torchlight-like illumination effect. When reflected by the ceiling, an indirect illumination is provided. Further, the light reflection action of the light-gathering device 2 greatly enhances the illumination. When the first reflector 4 is held in the extended position, it stops light from going vertically upwards and reflects light toward the second reflector 5, which, in turn, reflects reflected light from the first reflector 4 into the second light-guide member 6, where light is reflected and guided by the light reflecting element 61 and the wedge-shaped light guiding element 63 toward the light scattering element 62 and then scattered laterally outwards by the light scattering element 62, providing a soft illumination effect. Therefore, the upward illumination function is changed to a lateral profile or linear illumination function.

Figure 2:
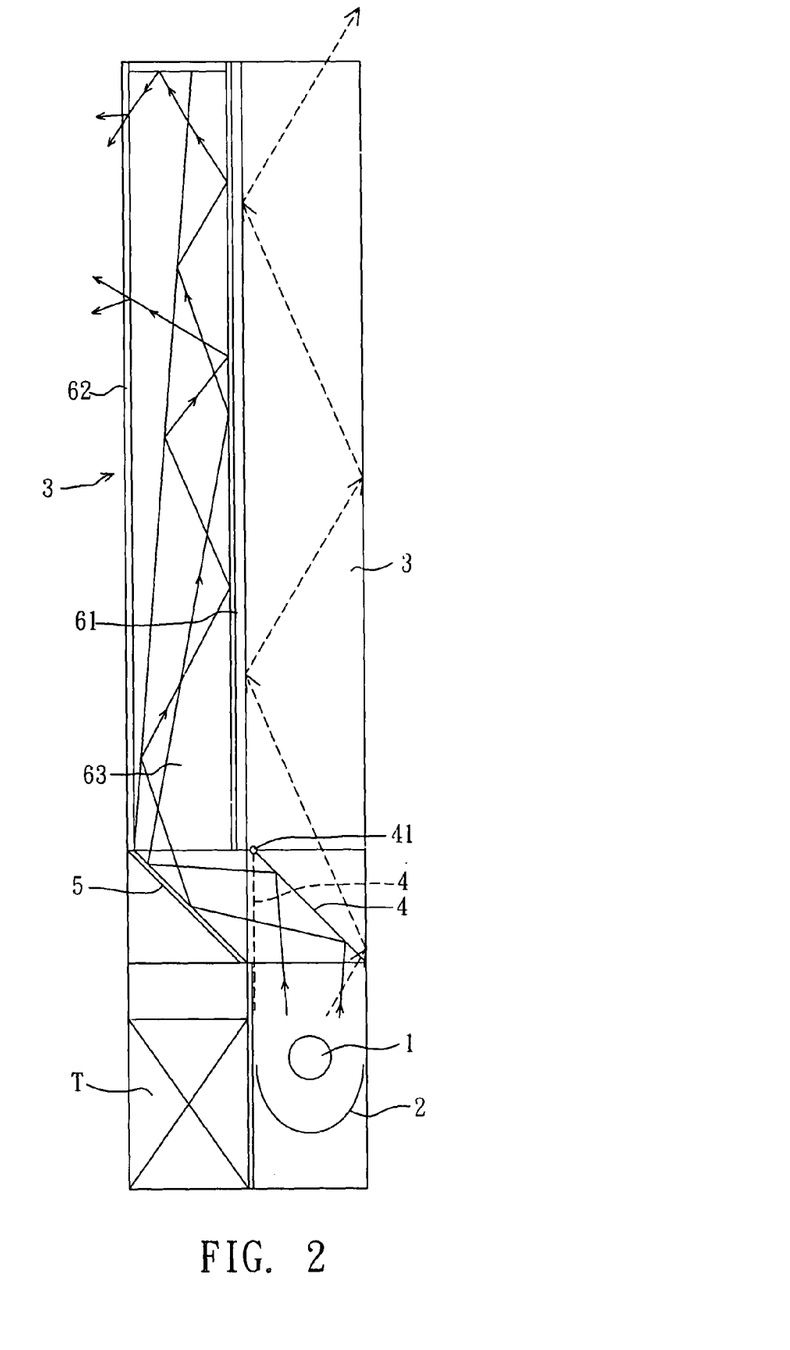
FIG. 2 is a schematic drawing of a multifunction lamp in accordance with a second embodiment of the present invention.

Referring to FIG. 2, the position-adjustable first reflector 4 can be set between the light source 1 and the first light-guide member 3, and the second reflector 5 can be disposed at one side relative to the position-adjustable first reflector 4. The second reflector 5 is fixedly disposed in a tilted position capable of reflecting light into the second light-guide member 6. When the first reflector 4 is held in the extended position, it reflects light toward the second reflector 5, which, in turn, reflects reflected light from the first reflector 4 into the second light-guide member 6, and therefore light rays are projected sideways subject to the effect of the light reflecting element 61, light scattering element 62 and wedge-shaped light guiding element 63 of the second light-guide member 6. When the first reflector 4 is turned downwards to the status not to interfere with light rays, as indicated by the imaginary line, the light of the light source 1 is permitted to go upwards to the outside via the first light-guide member 3.

The position of the second reflector 5 relative to the light source and the first light-guide according to the embodiment shown in FIG. 2 is different from that shown in FIG. 1, therefore the tilting direction of the second reflector 5 is in parallel to the extended position of the first reflector 4.

Figure 3:
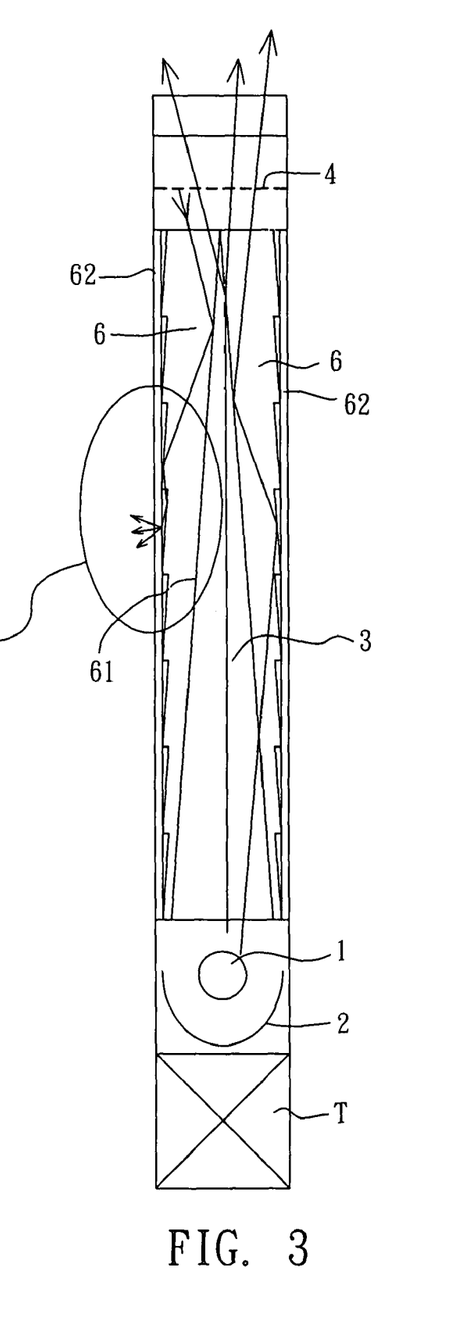
FIG. 3 is a schematic drawing of a multifunction lamp in accordance with a third embodiment of the present invention.

FIG. 3 illustrates another alternate form of the present invention. According to this embodiment, the first light-guide member 3 and the second light-guide member 6 use a common space, both constituting a column. When light goes upwards from the light source, it firstly enters the first light-guide member 3, which, according to this embodiment, is a cavity using air as light-guide medium. When light goes to the interface of the second light-guide member 6, which, according to this embodiment, is a, for example, PMMA (polymethylmethacrylate) member having a relatively higher light density and coefficient of refraction, a part of the light is reflected upwards and the other part of the light enters the second light-guide member 6. When the light that enters the second light-guide member 6 reaches the serrated outer interface, it is totally reflected and returned by the outside air, and the totally reflected and returned light is caused to go upwards to the outside through the top side of the lighting fixture without overflow due to the effect that the inner and outer interfaces of the second light-guide member 6 that disposed in contact with air are parallel planes (the configuration definition of the second light-guide). When the first reflector 4 is closed, the light can only be reflected downwards, and the downwardly reflected light enters the wedge-shaped second light-guide member 6 at first. When the light reaches the air interface of the first light-guide member 3, it is totally reflected and returned. When the light reaches the serrated outer interface, a part of the light flows over the short side of each tooth of the serrated outer interface to the light scattering element 62 and then goes sideways to the outside. Although the aforesaid first light-guide member 3 and the second light-guide member 6 are disposed within one same space, the light direction of the first light-guide member 3 is reversed to the light direction of the second light-guide member 6. Therefore, a different illumination effect is produced. By means of the effect of the first reflector 4, a different illumination function is obtained.

Figure 31:
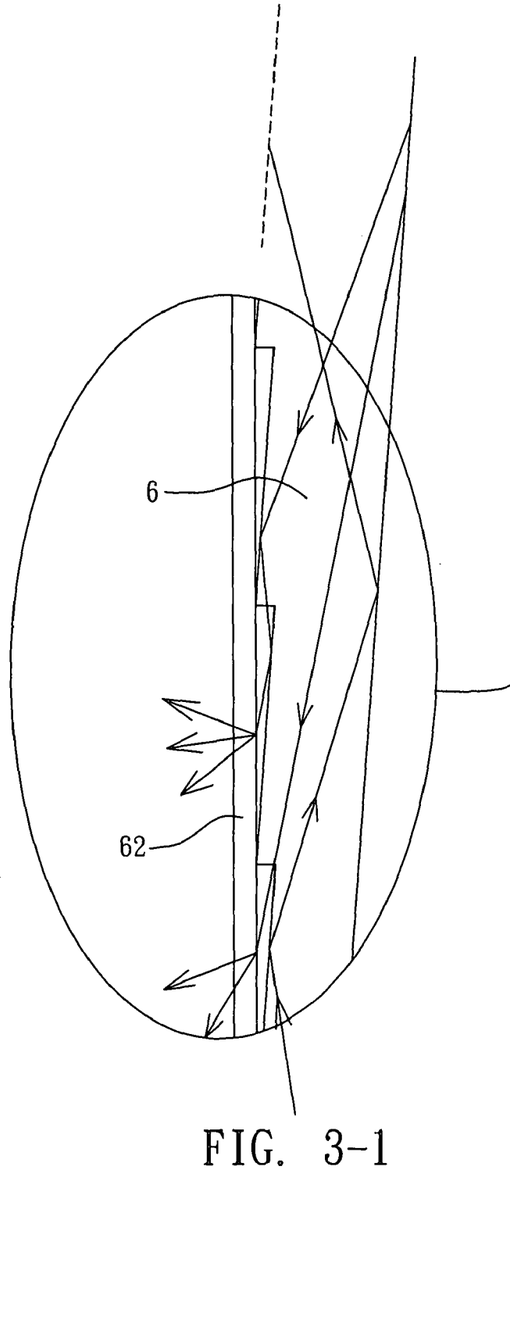

FIG. 3-1 is an enlarged view of a part of FIG. 3. As illustrated, the totally reflected up-going light finally reaches the other reflecting plane (see the imaginary line) that reflects the light totally upwards. At the same time, a part of the down-doing light goes to the outside through the serrated edge.

When light goes out of the top of the lamp shown in FIG. 3, the ceiling reflects the light, providing an indirect illumination effect. When light goes out of the periphery of the cylindrical body of the lamp, it provides space lighting. Therefore, two different lighting atmospheres are selectively provided.

Figure 4:
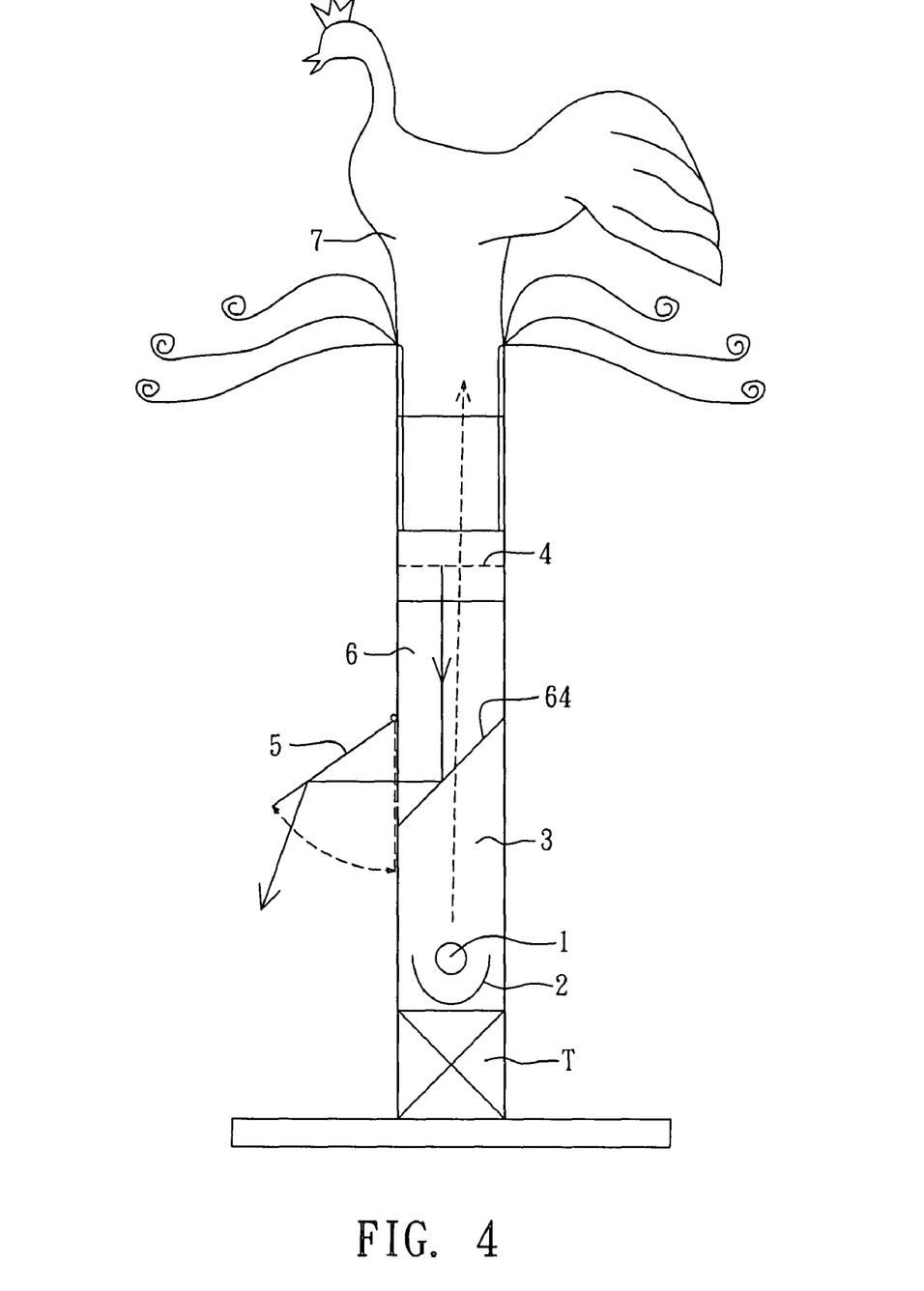
FIG. 4 is a schematic drawing of a multifunction lamp in accordance with a fourth embodiment of the present invention.

FIG. 4 illustrates still another alternate form of the present invention. This embodiment is a decorative lamp for lighting its top ornament. When opened the photomask, referenced by 5, the first reflector 4 that is linked to the photomask 5 through a linking mechanism (not shown) is closed. When the first reflector 4 is closed, the light that passes through the air cavity type first light-guide member 3 into the PMMA type second light-guide member 6, is emitted to the ornament at the top side of the lighting fixture and then reflected downwards by the ornament. When the down-going light reaches the interface between the second light-guide member 6 and the first light-guide member 3, an incident angle is greater than the total reflection angle, and therefore the down-going light is directed sideways due to the effect that the light goes from an optically denser medium to an optically thinner medium and the effect that the interface 64 tilts at an angle of 45 degrees. Because the photomask 5 is lifted, it reflects the light that goes out of the periphery of the second light-guide member 6 downwards toward the desk for reading.

When returns the photomask 5 to the closed position as shown in the imaginary line, the first reflector 4 is opened (the linking mechanism is not shown), allowing the light from the light source to go upwards and to illuminate the ornament.

The open/close reflector shown in FIGS. 3 and 4 can be of a swinging door-like design as shown in FIG. 7-1, rotary grill-like design as shown in FIG. 7-2, shutter design as shown in FIG. 7-3, or double swinging design as shown in FIG. 7-4.

Figure 5:
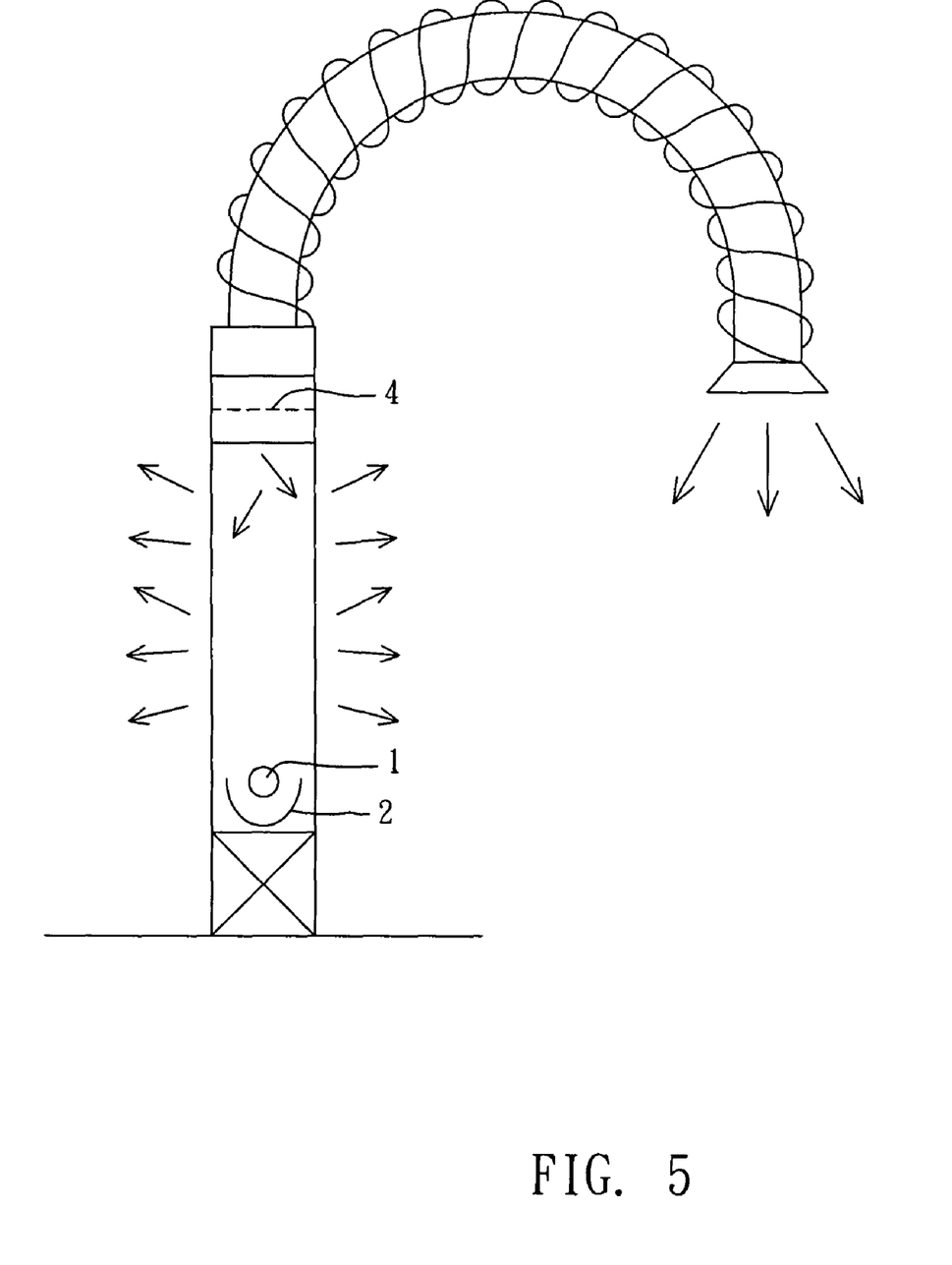
FIG. 5 is a schematic drawing of a multifunction lamp in accordance with a fifth embodiment of the present invention.

FIG. 5 illustrates still another alternate form of the present invention. This embodiment is a modification based on the embodiment shown in FIG. 3. When the reflector is opened for allowing the light from the light source keeps going upwards, an optical fiber bundle guides the up-going light for a local illumination. When closed the reflector 4, the light from the light source goes out of the periphery of the lighting fixture in all direction for space lighting. The spiral spring amounted around the optical fiber bundle supports the optical fiber bundle in shape and allows adjustment of the extending direction of the optical fiber bundle. Because the optical fiber bundle admits light and does not have any electric wire mounted therein, it is turnable through 360° like a bellows tube.

The embodiments shown in FIGS. 1 and 2 commonly use a position-adjustable primary reflector to guide the light from the light source from a first light path to a second light path through another light guide to provide a different illumination effect.

The embodiments shown in FIGS. 3 and 4 commonly use a close/open reflector to let the light from the light source pass or to reverse the direction of the light from the light source to an asymmetric light-guide, thereby providing different illumination effects.

The use can affixed the mirror face and move the first light-guide relative to the fixed mirror face to guide the light from the first light-guide into the second light-guide, as shown in FIG. 6.

Figures 61, 62:
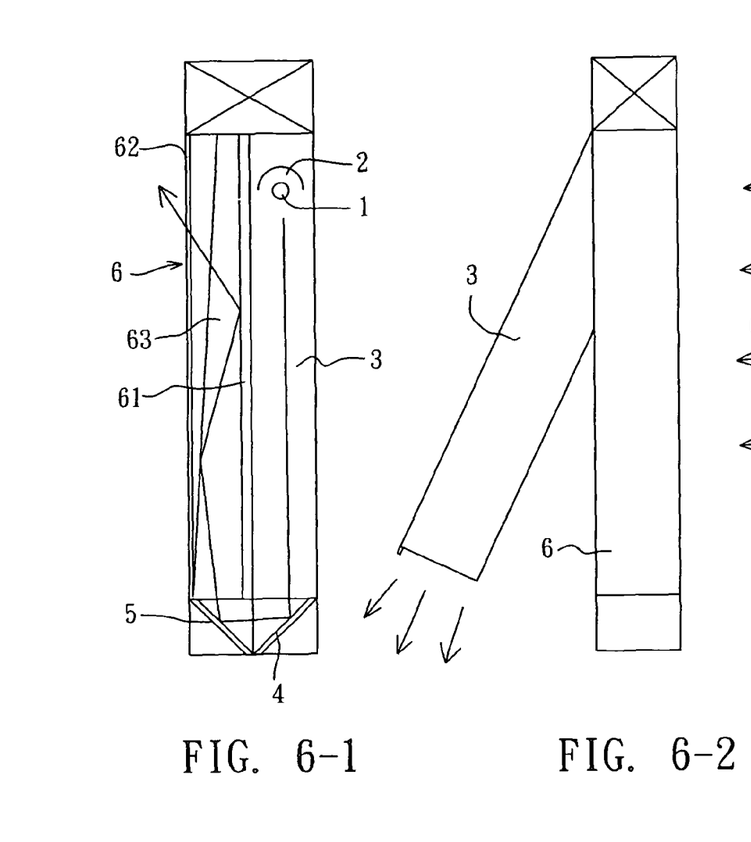

The first light-guide member 3 shown in FIG. 6-1 can be a foldable or pivoted design selectively settable between a received position and an extended position. When the first light-guide member 3 is in the received position, as shown in FIG. 6-1, the light from the light source goes through the fixed first reflector 4 and the fixed second reflector 5 into the second light-guide member 6, and then goes sideways out of the second light-guide member 6 subject to the effect of the light reflecting element 61, a light scattering element 62 and wedge-shaped light guiding element 63 of the second light-guide member 6. When the first light-guide member 3 is in the extended position, as shown in FIG. 6-2, the light from the light source is emitted out of the bottom side of the first light-guide member 3 for reading.

This design is practical for use as a reading lamp around the bed, or a wall lamp. When the first light-guide member 3 is in the extended position, the lighting fixture is used for reading. On the contrary, when the first light-guide member 3 is in the received position, the light goes out of the periphery of the lighting fixture toward the lateral side or the bed for space illumination.

Figure 63:
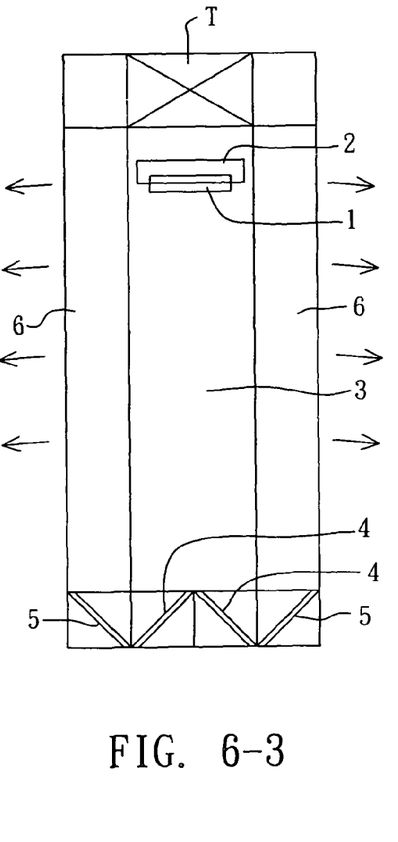

FIG. 6-3 is symmetrical design based on the embodiment shown in FIG. 6-1. When the first light-guide is in the received position, the light goes out of two opposite lateral sides of the lamp, showing a symmetrical sense of beauty. When the first light-guide is the extended position, the lamp works as a wall washer downlight or uplight (when reversely installed).

Figure 64:
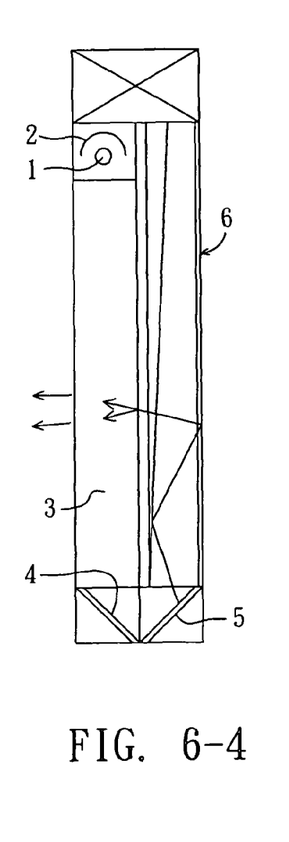
Figure 71:
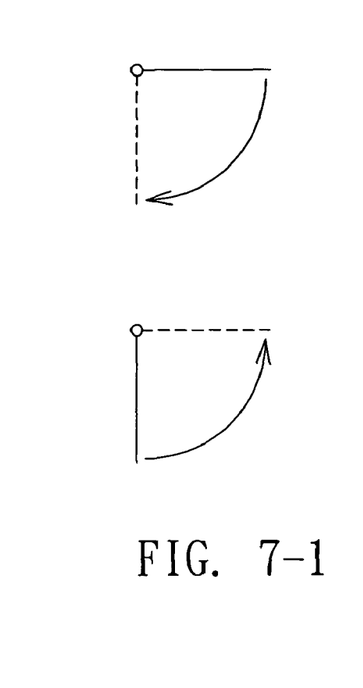
Figure 72:
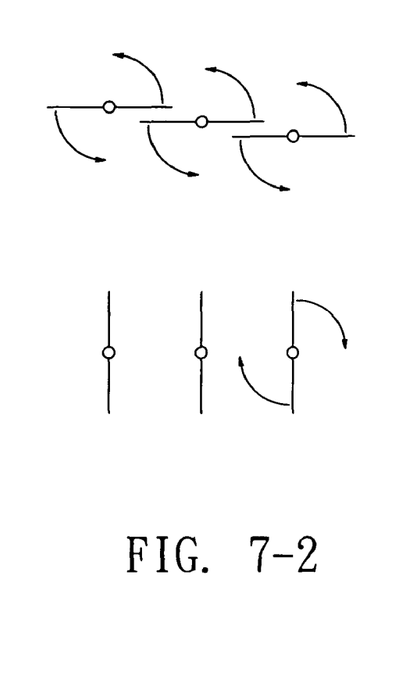
Figure 73:
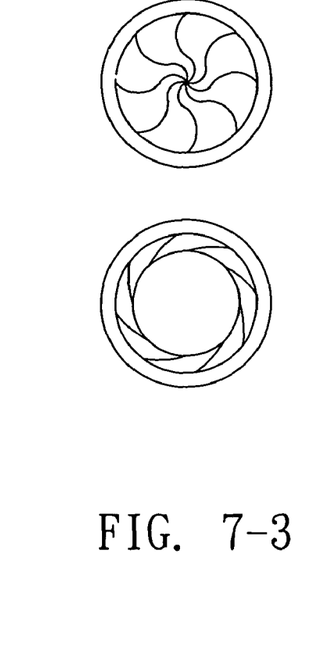
Figure 74:
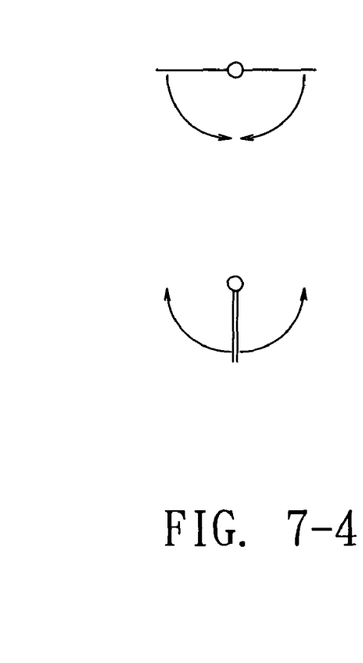

FIG. 6-4 illustrates the second light-guide installed behind the first light-guide. When the reflector reflects the light from the light source into the second light-guide member 6, the light is projected forwards subject to the effect of the light reflecting element 61, a light scattering element 62 and wedge-shaped light guiding element 63 of the second light-guide member 6. The first light-guide member 3 according to this embodiment is made of a transparent material, for example transparent PMMA (polymethylmethacrylate). The diffuse light that is projected forwards by the second light-guide member 6 goes through the first light-guide member, providing surface illumination.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A multifunction lamp comprising:
a light source;
a first reflector for receiving light from said light source and reflecting received light;
a second reflector for receiving light from said first reflector and reflecting received light;
a first light-guide member selectively settable in a first position between said light source and said first reflector and a second position at one end of said first reflector opposite to said light source; and
a second light-guide member for guiding out light from said second reflector.

2. The multifunction lamp as claimed in claim 1, wherein said first reflector is adjustable between a first position not to reflect light from said light source and a second position to reflect light from said light source.

3. The multifunction lamp as claimed in claim 1, wherein said first reflector is affixed to said light source.

4. The multifunction lamp as claimed in claim 1, wherein said first light-guide member is a cavity tube.

5. The multifunction lamp as claimed in claim 1, wherein said first light-guide member is a transparent solid member.

6. The. multifunction lamp as claimed in claim 1, wherein said first light-guide member and said second light-guide member are respectively disposed in two separated spaces.

7. The multifunction lamp as claimed in claim 6, wherein said second light-guide member is comprised of two light-guide members symmetrically disposed at two sides relative to said first light-guide member.

8. A multifunction lamp comprising:
a light source;
light reflector means settable between a first position to let light pass and a second position to reflects light in the reversed direction; and
an asymmetric light-guide column, said asymmetric light-guide column comprising a first light-guide zone and a second light-guide-zone;
wherein light from said light sources goes through said first light-guide zone of said asymmetric light-guide columns toward said light reflector means, and said light reflector means reflects light passing out of said first light-guide zone in the reversed direction toward said second light-guide zone when said light reflector means is set in said second position.

9. The multifunction lamp as claimed in claim 8, wherein said asymmetric light-guide column comprises an air cavity forming said first light-guide zone, and an optically denser wedge-like member forming said second light-guide zone, said optically denser wedge-like member having the shape of a triangle prism.

10. The multifunction lamp as claimed in claim 8, further comprising an optical fiber bundle fixedly or a light permeable ornament mounted on a top side thereof for guiding light.

11. The multifunction lampas claimed in claim 8, wherein said second light-guide zone is formed of polymethylmethacrylate, having an air interface slope abutted against said first light-guide zone for causing total internal reflection, and a pivoted photomask is provided and adapted to reflect light from said second light-guide zone downwards to an external work surface.

12. A multifunction lamp comprising:
a light source;
a first light-guide member fixedly connected to said light source;
a lighting fixture main body;
a coupling means having two lateral sides pin jointed to said lighting fixture main body coupling said light source and said first light-guide member to said lighting fixture main body and operable to move said light source and said first light-guide member in and out of said lighting fixture main body between a received position inside said lighting fixture main body and an extended position outside said lighting fixture main body;
said lighting fixture main body comprising fixed reflector unit formed of a first reflector and a second reflector, said first reflector being adapted to reflect light toward said second reflector, and a second light-guide adapted to guide reflected light from said second reflector toward a predetermined direction.

13. The multifunction lamp as claimed in claim 12, wherein said first light-guide member and said second light-guide member are disposed side to side in different spaces.

14. The multifunction lamp as claimed in claim 12, wherein said second light-guide member is comprised of two light-guide members arranged at two sides of said first light-guide member.

15. The multifunction lamp as claimed in claim 12, wherein said first light-guide member and said second light-guide member are disposed in two separated spaces one behind the other; said first light-guide member is a transparent light-guide member disposed in a front space said second light-guide is disposed in a rear space behind said front space; a reflection refraction mechanism is provided to project light entering said second light-guide member toward a front side for diffusion through first light-guide member.

\* \* \* \* \*